United States Patent

Leung et al.

[11] Patent Number: 6,167,394
[45] Date of Patent: Dec. 26, 2000

[54] INFORMATION MANAGEMENT SYSTEM WITH REMOTE ACCESS AND DISPLAY FEATURES

[75] Inventors: Edward Wing Cheung Leung, Palo Alto; Andrew Fu, Los Altos, both of Calif.

[73] Assignee: General Electric Company, Schenectady, N.Y.

[21] Appl. No.: 09/075,727

[22] Filed: May 11, 1998

[51] Int. Cl.[7] .................................................. G06F 17/30
[52] U.S. Cl. ................................................................ 707/3
[58] Field of Search ................................................ 707/3

[56] References Cited

U.S. PATENT DOCUMENTS

| | | | |
|---|---|---|---|
| 4,862,374 | 8/1989 | Ziemann | 701/200 |
| 4,870,576 | 9/1989 | Tornetta | 705/1 |
| 4,973,970 | 11/1990 | Reeser | 342/357.09 |
| 5,021,976 | 6/1991 | Wexelblat et al. | 345/356 |
| 5,032,989 | 7/1991 | Tornetta | 705/1 |
| 5,148,522 | 9/1992 | Okazaki | 345/348 |
| 5,241,671 | 8/1993 | Reed et al. | 707/104 |
| 5,272,769 | 12/1993 | Strnatka et al. | 345/346 |
| 5,295,062 | 3/1994 | Fukushima | 700/83 |
| 5,329,108 | 7/1994 | Lamoure | 235/494 |
| 5,329,464 | 7/1994 | Sumic et al. | 703/1 |
| 5,347,628 | 9/1994 | Brewer et al. | 345/351 |
| 5,367,627 | 11/1994 | Johnson | 345/357 |
| 5,416,312 | 5/1995 | Lamoure | 235/494 |
| 5,428,555 | 6/1995 | Starkey et al. | 700/275 |
| 5,495,567 | 2/1996 | Iizawa et al. | 345/334 |
| 5,519,609 | 5/1996 | Kuchenrither et al. | 702/5 |
| 5,535,316 | 7/1996 | Shinoaki et al. | 345/434 |
| 5,543,788 | 8/1996 | Mikuni | 340/990 |
| 5,552,989 | 9/1996 | Bertrand | 701/200 |
| 5,555,354 | 9/1996 | Strasnick et al. | 345/427 |
| 5,559,707 | 9/1996 | DeLorme et al. | 701/200 |
| 5,629,854 | 5/1997 | Schulte | 701/207 |
| 5,638,523 | 6/1997 | Mullet et al. | 345/326 |
| 5,652,717 | 7/1997 | Miller et al. | 703/6 |
| 5,664,112 | 9/1997 | Sturgeon et al. | 705/28 |
| 5,790,121 | 8/1998 | Sklar et al. | 345/356 |
| 5,852,810 | 12/1998 | Sotiroff et al. | 705/27 |
| 5,930,474 | 7/1999 | Dunworth et al. | 709/217 |
| 5,945,985 | 8/1999 | Babin et al. | 345/302 |
| 5,968,109 | 10/1999 | Israni et al. | 701/208 |
| 6,041,281 | 3/2000 | Nimura et al. | 701/211 |

*Primary Examiner*—Maria N. Von Buhr
*Attorney, Agent, or Firm*—Welsh & Katz, Ltd.; Damian G. Wasserbauer; Carl B. Horton

[57] ABSTRACT

A computer-based document management system that utilizes a geographic interface and allows any interested party to view individually selected location-specific documents which are stored in a particular geographic location from anywhere in the world is disclosed. Examples of the site-specific documents include, for example, MSDS information. Access to this electronically stored information may be had via any suitable medium such as, for example, the internet, the world wide web, an intranet, or a local area network.

6 Claims, 4 Drawing Sheets

GE NUCLEAR ENERGY EHS

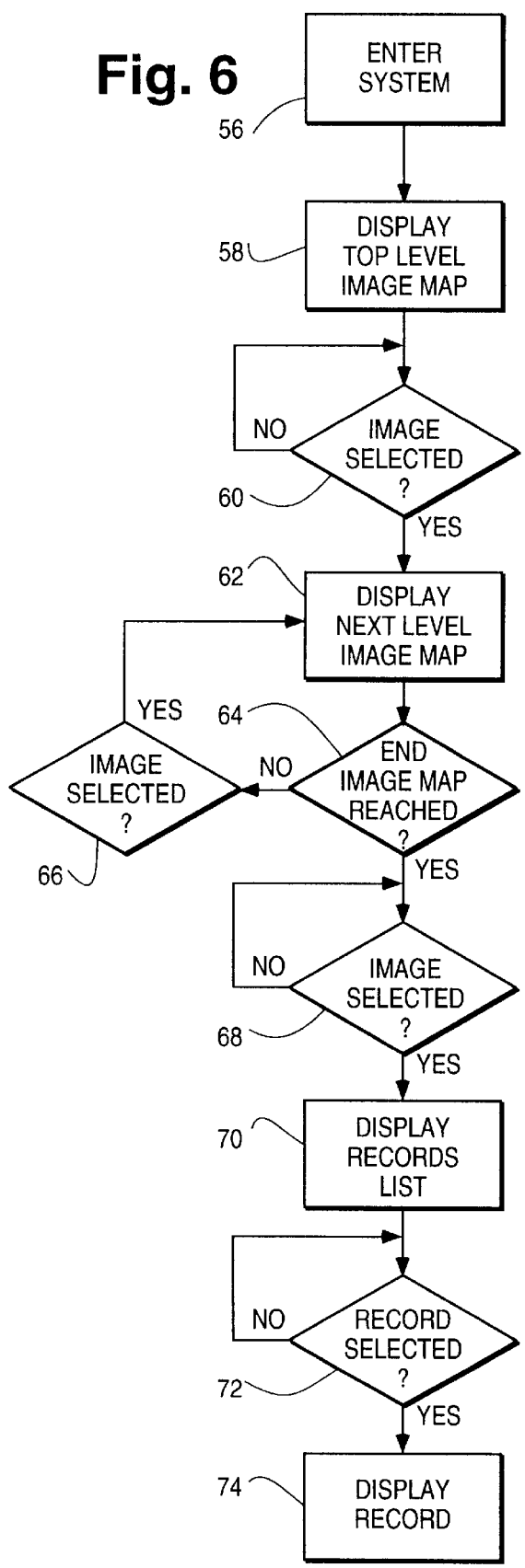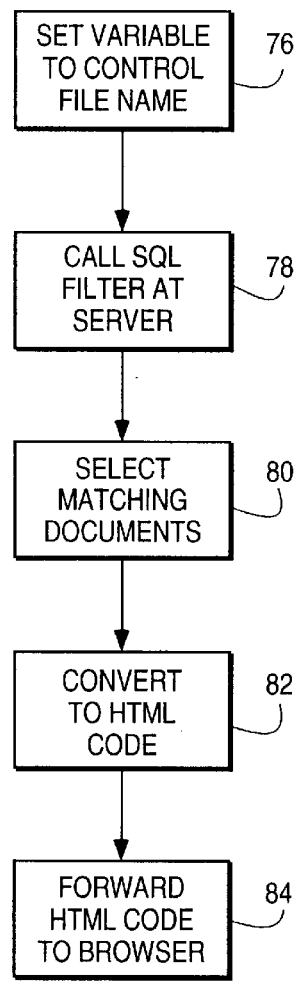

INFORMATION MANAGEMENT SYSTEM WITH REMOTE ACCESS AND DISPLAY FEATURES

FIELD OF THE INVENTION

The present invention generally relates to information management systems and, more particularly, to a computer-based document management system that allows a user to view individually selected documents which are stored at a particular geographical location from anywhere in the world.

BACKGROUND OF THE INVENTION

Organizations and other business entities such as, for example, large international corporations typically have a number of widely geographically dispersed facilities and maintain various documents and other official location-specific records at each one of these locations. Such location-specific records include, for example, financial reports, production statistics, and the like for each one of the corporation's separate facilities. Often it is desirable for such locationspecific information to be shared on an immediate basis with each of the related entities for various reasons such as, for example, management issues concerning daily operations of the corporation.

Certain laws and regulations require that any business that meets certain specified criteria maintain detailed safety records concerning all of the chemicals or other hazardous substances that may be used or consumed in the daily course of the business' activities. Particularly, for example, the OSHA Hazardous Communication regulations specified in 29 C.F.R. §1910 require that every business with ten or more employees maintain a document called an MSDS (material safety data sheet) for each chemical that the business uses or consumes. Large fines and other penalties can be assessed against a business that fails to maintain the MSDS records or other pertinent information in an orderly fashion or if the company fails to make these records available in a certain timeframe to an interested party who requests the information under the community right to know provisions that are written into the applicable laws and regulations.

Typically, companies arrange all of the MSDS sheets that each facility of the company has in three-ring binders. These binders usually are stored in various locations in each facility of the company and are available to the public. This arrangement is suitable for allowing individuals who are in the vicinity of the facility to access the documents that are stored in the binders. However, there are a number of problems associated with storing the MSDS information in this manner. For example, the MSDS information must be periodically updated. Thus, at any particular time, the binders containing the MSDS documents may not contain the most up-to-date version of the documents due to the lag time associated with obtaining and then appropriately filing the new documents.

There are other problems are associated with storing MSDS information in the above-referenced manner. For example, it is desirable for firefighters and other emergency personnel to have immediate and ready access to the MSDS information so that these persons are placed in a better position to handle any emergency situation that may arise at a particular facility. Storing the MSDS information in three-ringed binders at each individual facility does not allow emergency personnel to view the information from a location remote from the facility and, therefore, hinders their ability to deal with any emergency situation that may arise.

Storing the MSDS information on an electronic medium such as, for example, a CD-ROM does not address the aforementioned time lag and emergency access issues.

SUMMARY OF THE INVENTION

It is desirable to provide a computer-based document management system that utilizes a geographic interface and allows any interested party to view individually selected location-specific documents such as, for example, MSDS records which are stored in a particular geographic location from anywhere in the world. Access to this information may be had via any suitable medium such as, for example, the internet, the world wide web, an intranet, or a local area network. Such a document management system has a number of advantages.

First, a graphical interface that allows a user to remotely access site-specific documents is simple to use and eliminates the need of requiring users to be familiar with database commands and other complicated computer-based interfaces. Second, the documents that are stored at one location can be viewed from any location remote from the storage location at any time. Third, the ability of a business to comply with federal and state regulations concerning the record keeping requirements for any chemicals or other hazardous substances the business uses is increased. Fourth, emergency personnel are in a better position to deal with any emergency situation, such as a fire, that may arise at a particular facility due to the knowledge of the chemicals that are present in the location.

Other features and advantages of the invention will become apparent from the description that follows.

DESCRIPTION OF THE DRAWINGS

FIG. 6 is a flow chart which illustrates the steps to be executed for a user to locate and display a record that is stored at a particular location; and FIG. 7 is a flow chart which illustrates the steps that are executed by a web browser and server in order to display the records list associated with a bottom-level client-side clickable map.

DETAILED DESCRIPTION OF THE INVENTION

Figure 1:
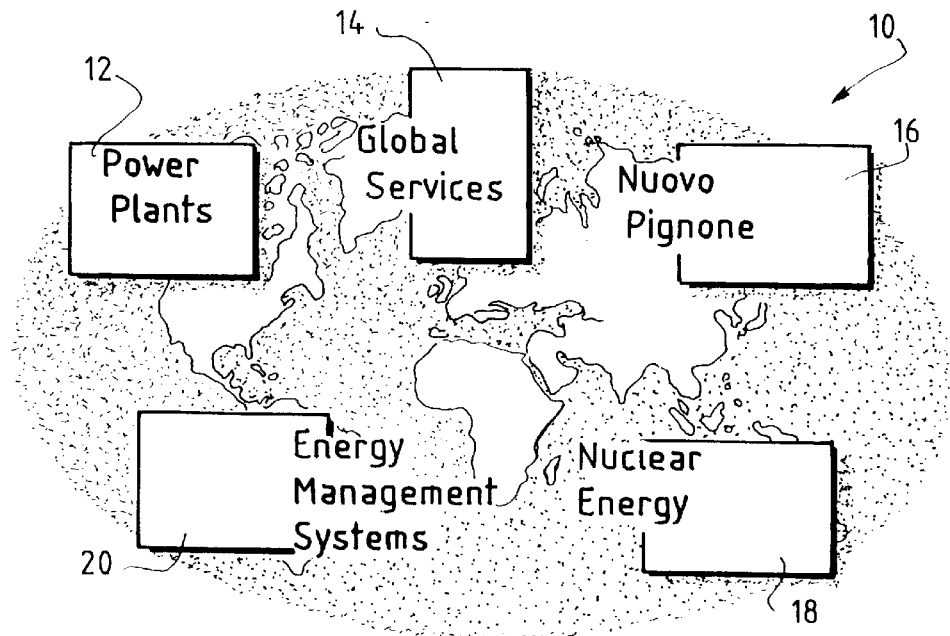
FIG. 1 illustrates an example of a top level image map according to an embodiment of the present invention.

Referring to FIG. 1, an example of a top level image map 10 according to an embodiment of the present invention is illustrated. Image map 10 includes five client-side clickable maps 12, 14, 16, 18, and 20. A client-side clickable map is an Internet industry standard that presents graphic information to the displays of webbrowser software that have certain active areas. Utilizing a standard pointing device such as a mouse (not shown), a user clicks on a given one of active areas to allow the user to navigate to other areas that are related to the graphics presented, as readily apparent to one of ordinary skill in the art.

A top level image map contains a plurality of client-side clickable maps, the number of which is generally related, for example, to the organizational structure of a particular business concern or division thereof. In a preferred embodiment of the invention, the number of client-side clickable maps is equal to the number of divisions of a business concern that must meet and comply with the rules and regulations concerning the storage of chemicals or other hazardous substances that the business concern may use. In the embodiment shown in FIG. 1, top level image map 10 contains client-side clickable maps 12, 14, 16, 18, and 20 that allow a user to navigate to the areas associated therewith, which are entitled power plants, global services, nuovo pignones, nuclear energy, and energy management systems, respectively. These maps are assigned the following file names which allow certain database queries to be formed from optimized path information as discussed in greater detail hereafter: powerplants.htm, globalservices.htm, nuovo.htm, nuclear.htm, energymanagement.htm.

Figure 2:
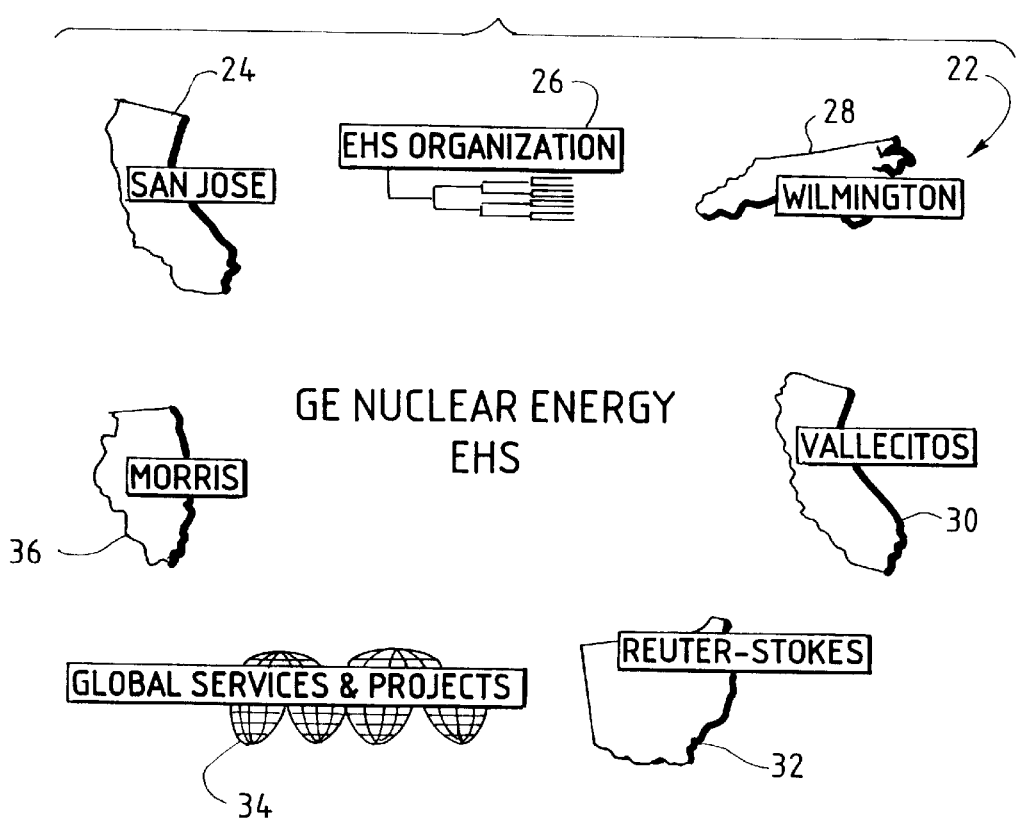
FIG. 2 shows an example of an intermediate level image map according to an embodiment of the present invention.

Referring to FIG. 2, an example of an intermediate level image map 22 according to an embodiment of the present invention is shown. Preferably, each intermediate level image map contains a plurality of client-side clickable maps, the number of which generally relates, for example, to the organizational structure of the entity described in the top level image map associated therewith. In the embodiment of the invention shown in FIGS. 1 and 2, a user may navigate to intermediate level image map 22 by clicking on the client-side clickable map 19 entitled nuclear energy shown in FIG. 1.

Image map 22 contains client-side clickable maps 24, 26, 28, 30, 32, 34, and 36 which are entitled San Jose, EHS Organization, Wilmington, Vallecitos, Reuter-Stokes, Global Services & Projects, and Morris, respectively, and allow a user to navigate to the areas associated therewith. For example, clicking on map 24 allows a user to navigate from the intermediate level image map 22 to the image map 38 shown in FIG. 3. These maps are assigned the following file names which allow certain database queries to be formed from optimized path information as discussed in greater detail hereafter: gene-ehs.htm, SanJosemsds.htm, Wilmington_msds.htm, Vallecitos-msds.htm, Reuter-Stokes-msds.htm, Global-Services-msds.htm, and Morris-msds.htm.

One aspect of the present invention is that images of the various facilities of a business concern such as, for example, direct overhead photographs may be digitized and utilized as image maps. For example, the bottom level image map 38 is an overhead photographic image of the facility associated with the intermediate level image map 24 shown in FIG. 2.

Figure 3:
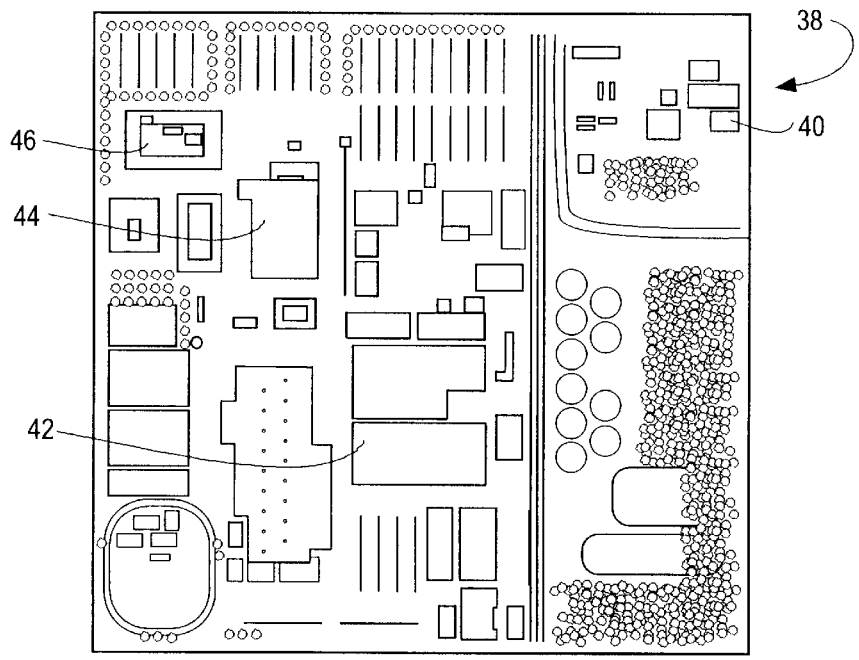
FIG. 3 illustrates an example of a bottom level image map according to an embodiment of the present invention.

In the preferred embodiment of the invention, each photographic image map contains a number of client-side clickable maps equal to the number of buildings shown in the photograph which contain location-specific documents such as, for example, MSDS information. In the embodiment shown in FIG. 3, client-side clickable maps 40, 42, 44, and 46 are shown as representative samples of the buildings illustrated therein. Clicking on the client-side clickable map associated with each building in the photograph allows a user to navigate to the image map associated therewith. The maps shown in FIG. 3 are assigned the following file names: TrngCenter.htm, MetCalLab.htm, MetLab.htm,ESC.htm.

An aspect of the present invention is that bottom level image maps may display various aspects of the construction of each building shown in a particular photograph or other image map. This feature is particularly advantageous when, for example, there is a fire or other emergency situation in a large building containing a number of volatile chemicals in various rooms. Utilization of the present invention in such a situation allows the firefighters to be better able to manage and fight the fire.

Figure 4:
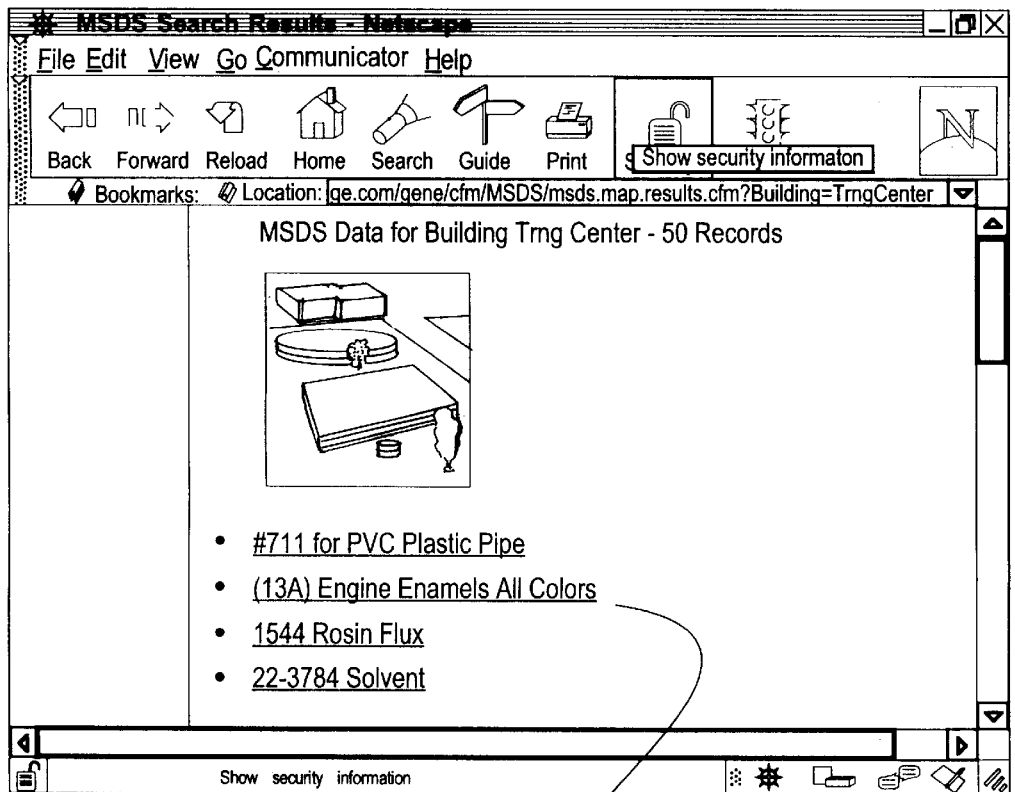
FIG. 4 illustrates an example of a screen display and user interface which shows a list of the records contained in a location specified in the bottom level image map shown in FIG. 3.
Figure 5:
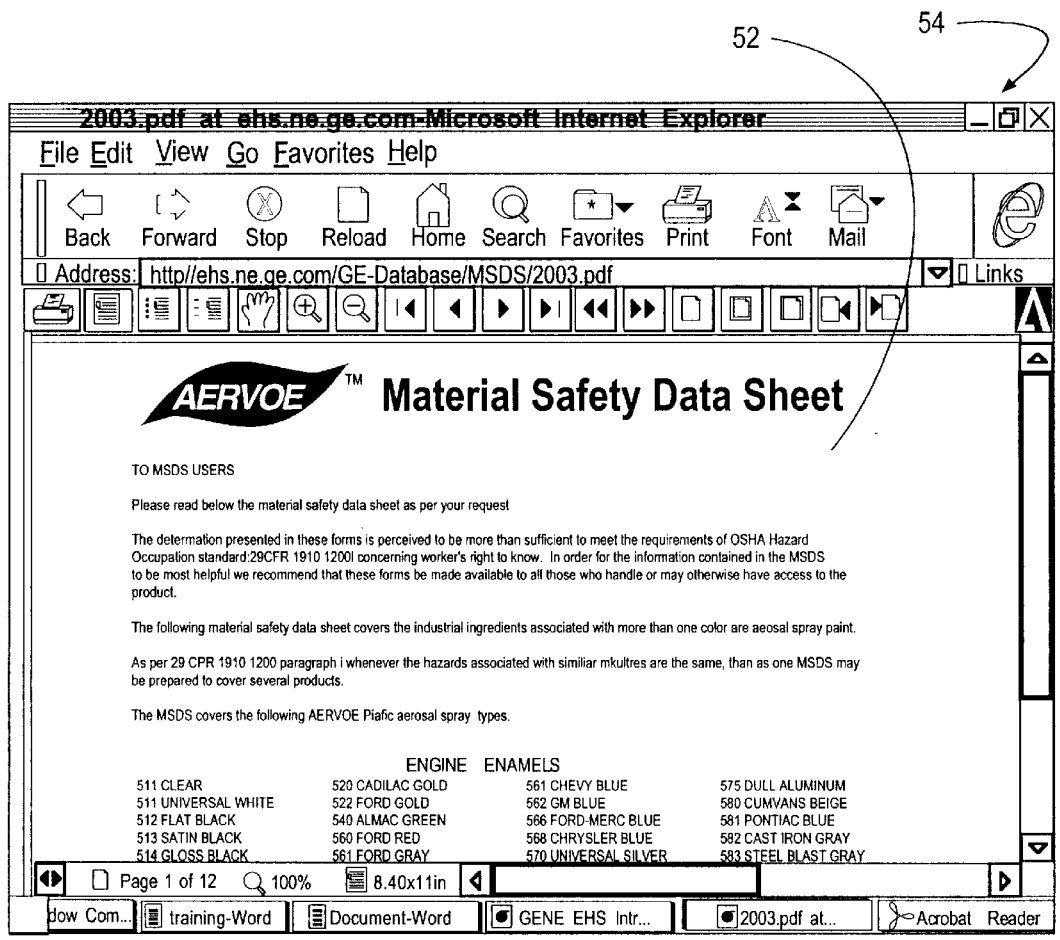
FIG. 5 is an example of a screen display and user interface which shows an example of one item of MSDS information.

Referring back to FIG. 3, clicking on the client-side clickable map 40 allows a user to navigate to the screen display and user interface 48 shown in FIG. 4. Interface 48 shows a list of the records contained in the location specified by client-side clickable map 40. Each one of these records is displayed as a client-side clickable map on user interface 48. Clicking on client-side clickable map 50 causes the MSDS information 52 associated therewith to be displayed as shown in the screen display and user interface 54 shown in FIG. 5. The list shown in FIG. 4 is constructed from a database containing all of the documentary information for a business concern or other entity which is described by the top, intermediate, and bottom level image maps associated therewith as discussed in greater detail hereafter.

FIG. 6 is a flow chart which illustrates the steps to be executed for a user to locate and display a list of the records that are stored at a particular location. In step 56, a user enters the document management system via a hyper text markup language ("HTML") browser such as, for example, Netscape® or Internet Explorer® by entering the internet address of the document management system into the browser. The browser directs the user to the home page of the document management system. Once the system is entered, the top level image map associated therewith is displayed, step 58. After a user selects a client-side clickable map that is displayed on the top level image map, the system displays the next level image map associated therewith, steps 60 and 62.

In step 64, the system determines whether the current image map displayed is a bottom level image map. If the current image map is not a bottom level image map, then the user selects a client-side clickable map displayed on the current image map, step 66. Then, the system returns to step 62. If the current image map is a bottom level image map and the user selects a client-side clickable map on the bottom level image map, then a list of all of the pertinent site-specific documents such as, for example, MSDS information stored at that location is shown on the screen display and user interface shown in FIG. 4, steps 68 and 70. After a user selects a record, the selected record is displayed, steps 72 and 74.

According to a first embodiment of the present invention, during steps 58, 60, 62, 64, 66, 68, and 70, the path that the user takes from the top level image map to the user-selected client-side clickable map on the bottom level image map is stored in memory either at the user's computer or at the server which contains the aforementioned database of location-specific records. Preferably, this is accomplished by concatanating the path information into a control file name which lists each one of the image maps that a user visits. For example, when the user clicks on map 16 (Nuclear.htm), map 24 (SanJose-msds.htm), and map 40 (TmgCenter.htm), the file name for each map is concatenated into the following control file name: Nuclear.SanJose-msds.TrngCenter.

The path information is optimized in step 70 so that the most direct route from the top level image map to the user-selected client-side clickable map on the bottom level image map is stored in memory. Preferably, this is accomplished by eliminating any redundancies in the path information. For example, when the user clicks on map 17 (Nuclear.htm), map 24 (SanJose-msds.htm), map 40 (TrngCenter.htm), map 24 (SanJose-msds.htm), and map 46 (ESC.htm), then the control file name "Nuclear.SanJose-msds.TrngCenter.SanJose-msds.ESC" is optimized by eliminating the redundancy with respect to map 24. The optimized control file name is as follows: Nuclear.SanJose-msds.ESC.

According to a second embodiment of the invention, optimized path information is associated in memory with each one of the client-side clickable maps contained in an end level image map. For example, the control file name "Nuclear.SanJose-msds.MetLab" is stored in memory and is associated with bottom-level map 44. This embodiment is the preferred embodiment of the present invention because, for example, the need for storing and optimizing path information is eliminated.

FIG. 7 is a flow chart which illustrates the sub-steps of step 70 (FIG. 6) that are executed by a web browser and server in order to display the records list associated with a bottom-level client-side clickable map according to either embodiment of the invention discussed above. The web browser sets a variable equal to the control file name associated with the bottom-level map selected by the user or to the optimized path and calls the SQL filter at the server, steps 76 and 78. It should be noted that the control file name represents the optimized path to the selected bottom-level image map and that SQL code is an industry standard method by which queries to a computer database can be made.

For example, in accordance with the preferred embodiment of the invention, map 40 (FIG. 3) is programmed to contain the following information:

<AREA SHAPE="RECT" COORDS="221,154,251, 159"

HREF="cfm/MSDS/msds-map.results.cfm?

Building#=Nuclear.SanJose-msds.TrngCenter">

By clicking on the area defined by the rectangular coordinates, the "msds-map.results.cfm" program is called and the building variable for use with this program is set to the control file name associated with map 40 as set forth above. Alternatively, clicking on map 40 causes the path information to be concatenated into a control file name which is then optimized as discussed above with reference to the first embodiment of the invention. In this case, the building variable is set to the optimized control file name.

When the server receives the above-referenced information, which is in the form of SQL commands, the location-specific records that are associated with map 40 are selected, step 80. A product which is suitable for allowing a server to filter SQL code in this manner is commercially available from Allaire Corporation (Cambridge, Mass.) and is called Coldfusion®. In this case, the server may execute the following program steps:

(1) SELECT*FROM MSDSLoc,MSDS (2) WHERE MSDSloc.MSDSID=MSDS.AutoSDSID AND MSDSloc.Bldg LIKE '#Building"'

(3) ORDER BY MSDS.TradeName.

Particularly, the SQL commands sort through the database and produce a name list of the MSDS documents stored at the location associated with the user-selected client-side clickable map on the bottom level image map as, for example, shown in FIG. 4. Thereafter, the server coverts the retrieved MSDS records into HTML code and forwards the same to the user's web browser, steps 82 and 84. The HTML browser typically utilizes a document display plug-in such as Adobe Acrobat® to allow the user to view and print individual ones of the selected documents as, for example, illustrated in FIG. 5.

While the invention has been illustrated and described in detail in the drawings and foregoing description, the same is considered as illustrative and not restrictive in character, it being understood that all changes and modification that come within the spirit of the invention are desired to be protected.

What is claimed is:

1. A method of viewing a digitized representation of a selected one of a plurality of documents, the method comprising the steps of:

providing a plurality of digitized representations of regulatory-type documents, the regulatory-type documents including data concerning hazardous substances stored at least one location of a business establishment;

storing the regulatory-type documents in a database;

providing a graphical interface having a first level image and a plurality of second level images, at least one of the second level images corresponding to a specific location of the business establishment;

associating the regulatory-type documents with the plurality of second level images;

forming a database query by selecting the first level image and at least one of the second level images;

optimizing path information formed by the database query;

utilizing the database query to generate and display a list of the regulatory-type documents, the list containing the regulatory documents corresponding to the specific location of the business establishment; and displaying a selected regulatory document in the list of regulatory-type documents.

2. The method according to claim 1 wherein the second level images are arranged in a hierarchy to form multiple levels of the second level images.

3. The method according to claim 1 wherein at least one of the first and second level images comprise a digitized representation of a photographic image such that the path information created by the step of selecting the first level image and at least one of the second level images specifies the sequence of images chosen by a user.

4. The method according to claim 3 wherein the path information includes an indication of a sequence of the photographic images selected by the user, and does not include information relating to the regulatory-type documents.

5. The method according to claim 2 wherein a lowest level of the multiple levels of second level images selected by the user correspond to the specific location of the business establishment.

6. The method according to claim 2 wherein a lowest level of the multiple levels of second level images selected by the user correspond to the regulatory-types documents associated with the specific location of the business establishment.

* * * * *